No. 759,564. PATENTED MAY 10, 1904.
W. SOBEY.
WHEEL HUB.
APPLICATION FILED FEB. 24, 1903.
NO MODEL.

Witnesses
Fred Gulach
Alberta Adamick

Inventor:
Wm Sobey
By Pince & Fisher
his Attorneys.

No. 759,564. Patented May 10, 1904.

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

WHEEL-HUB.

SPECIFICATION forming part of Letters Patent No. 759,564, dated May 10, 1904.

Application filed February 24, 1903. Serial No. 144,651. (No model.)

*To all whom it may concern:*

Be it known that I, WILLIAM SOBEY, a citizen of the United States, and a resident of Racine, in the county of Racine, State of Wisconsin, have invented certain new and useful Improvements in Wheel-Hubs for Agricultural Implements, of which the following is a full, clear, and exact description.

This invention has for its object, primarily, to provide improved means for attaching the wheels of agricultural implements to their axles in such manner that the lubrication of the axles may be effectively secured and the access of dust to the bearings of the axles may be guarded against.

The invention consists in the features of improvement hereinafter described, illustrated in the accompanying drawings, and particularly pointed out in the claims at the end of this specification.

Figure 1:
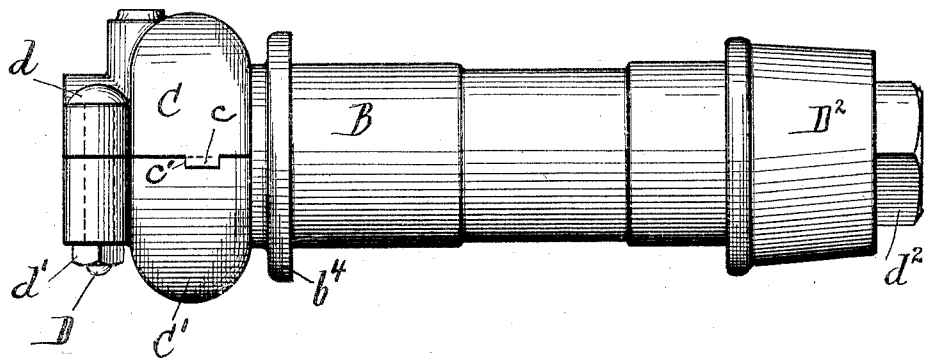
Figure 2:
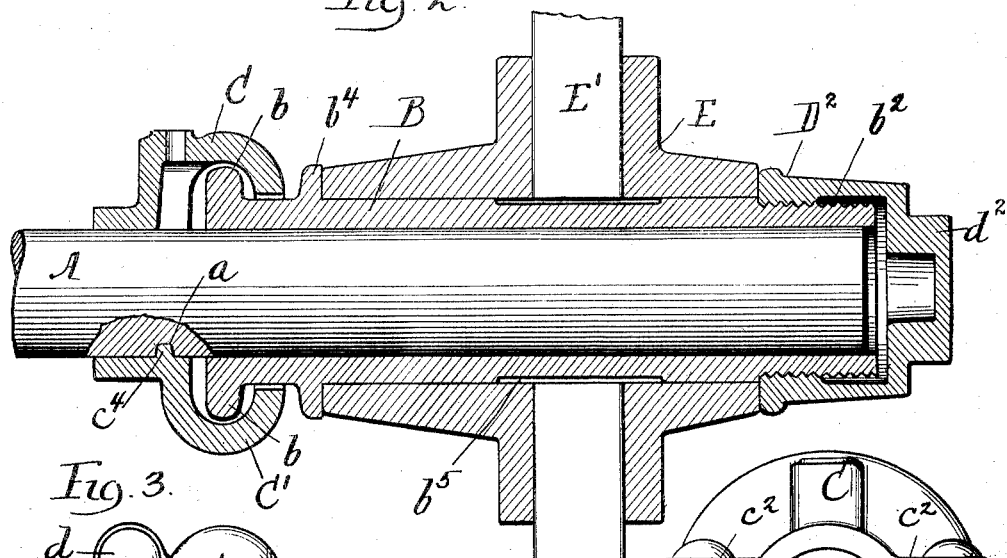
Figure 3:
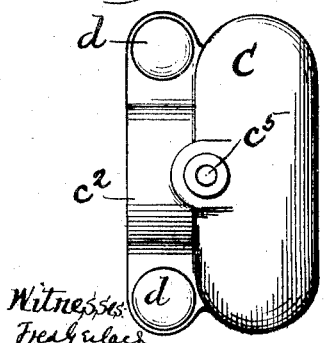
Figure 4:
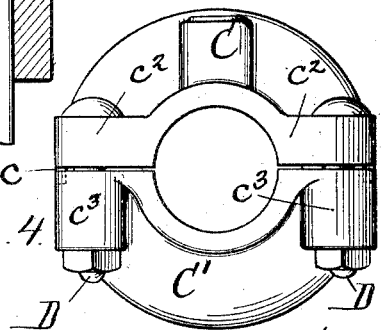

Figure 1 is a view in elevation of the hub-sleeve with connected parts. Fig. 2 is a view in vertical longitudinal section of the parts illustrated in Fig. 1 and with a portion of the wheel in position thereon. Fig. 3 is a detail plan view of one of the clamp-boxes. Fig. 4 is a detail end view of the interlocked sections of the clamp-box.

A designates the axle, and B denotes the hub-sleeve mounted thereon. The hub-sleeve B is of such diameter as to snugly receive the axle while at the same time allowing the hub to revolve thereon. The inner end of the hub-sleeve B is provided with a peripheral flange $b$, over which set the sections C and C' of the clamp-box, whereby the hub-sleeve is retained in position upon the axle. The sections C and C' of this clamp-box are formed at each side with interlocking tongues, and grooves $c$ and $c'$ and the sections C and C' are formed with flanges $c^2$ and $c^3$, through which pass the bolts D, whereby the sections C and C' are held securely together and in position upon the axle A. As shown, the bolts D are formed with heads $d$ and are provided with retaining-nuts $d'$. One of the sections of the clamp-box is provided with a lug $c^4$, that sets within a recess $a$, formed in the periphery of the axle A, so that when the sections of the clamp-box are in position for use, as shown in the drawings, they will be rigidly secured to the axle, so that they can neither revolve thereon nor move lengthwise thereof. The chambered sections C and C' of the clamp-box set over the peripheral flange $b$ of the hub-sleeve loosely enough to permit a free revolution of the sleeve upon the axle and yet guard the hub-sleeve against movement in longitudinal direction. As shown, the upper section C of the clamp-box is provided with a perforation $c^5$, whereby lubricating material may be admitted to the interior of the clamp-box.

The outer end of the hub-sleeve B is screw-threaded, as at $b^2$, and over this externally-screw-threaded end of the sleeve B sets the vertically-threaded cap $D^2$. This cap $D^2$ performs the function of retaining the annular spoke-socket E upon the hub-sleeve B, and being chambered, as shown, it serves also as a receptacle for grease that will be forced into the slight space between the axle A and the hub-sleeve B when the cap $D^2$ is screwed in position for use, as shown in Figs. 1 and 2 of the drawings. The cap $D^2$ is formed, preferably, with a squared portion $d^2$, adapted to receive a wrench, whereby the cap may be set in position upon the sleeve B of the hub. The hub-sleeve B is provided adjacent its inner end with a peripheral flange or abutment $b^4$, against which will bear the inner end of the annular spoke-socket E, this socket E being provided with large holes to receive the inner ends of the spokes E'. As shown, the periphery of the hub-sleeve B is formed with an annular recess $b^5$ at that portion of the periphery of the hub-sleeve opposite the ends of the spokes E'.

It will be observed that the spoke-socket E is rigidly held in position upon the sleeve B between the flange or abutment $b^4$ and the end of the cap $D^2$ and out of contact with the hub-retaining clamp.

When the parts are set in position for use, as shown in Fig. 2 of the drawings, the hub-sleeve B will be held securely upon the axle A by means of the sections C and C' of the clamp-box. The annular spoke-socket E will be securely retained upon the hub-sleeve B between the peripheral flange $b^4$ and the inner end of the cap $D^2$. As the cap $D^2$ is screwed to the position seen in Fig. 2, its chamber having first been filled with grease, the grease will be forced into the slight space between the surface of the axle A and of the hub-sleeve B. The grease remaining within the chamber of the cap $D^2$ will serve to insure the lubrication of the axle for a long period and will prevent the access of dirt or dust to the outer end of the sleeve. The clamp-box at the inner end of the hub-sleeve not only serves to retain the hub in position, but serves also to prevent access of dust to the bearing-surface of the axle, and, furthermore, serves as a chamber to receive and retain the lubricant that may escape from the inner end of the hub-sleeve B or that may be admitted to the clamp-box through the perforation $c^5$.

Having thus described my invention, what I claim as new, and desire to secure by Letters Patent, is—

1. The combination with the hub-sleeve having an exteriorly-threaded portion at its outer end, of an interiorly-threaded, chambered cap engaging the outer threaded portion of said sleeve, an abutment fixed on said sleeve, an annular spoke-socket rigidly held in place upon said sleeve between said abutment and the inner end of said cap, a peripheral flange on the inner end of said hub-sleeve and means engaging said flange for rotatably securing the hub upon the axle.

2. The combination with the hub-sleeve having an exteriorly-threaded portion at its outer end, of an interiorly-threaded, chambered cap engaging the outer end of said sleeve, an annular flange on said sleeve, an annular spoke-socket rigidly held in place upon said sleeve between said flange and the inner end of said cap, a second annular flange on the inner end of said sleeve and a clamp engaging said second flange for rotatably securing the hub upon the axle.

3. The combination of the hub-sleeve B having a threaded portion $b^2$ at its outer end and the annular flanges $b$ and $b^4$ at its inner end, the interiorly-threaded chambered cap $D^2$ engaging the outer threaded portion $b^2$ and having the squared portion $d^2$ upon its outer end, the annular spoke-socket E rigidly held in place between the flange $b^4$ and the inner end of the cap $B^2$, and the clamp-box C engaging the flange $b$ for rotatably securing the hub upon the axle.

WILLIAM SOBEY.

Witnesses:
GEORGE HENRY BOLTON,
LAWRENCE SCHIBSBY.